A. BAUSCHLICHER.
GAGE.
APPLICATION FILED NOV. 12, 1910.

1,072,378.

Patented Sept. 2, 1913.

Witnesses:

Inventor
August Bauschlicher
By his Attorneys, Rogers, Kennsdy & Campbell, by

UNITED STATES PATENT OFFICE.

AUGUST BAUSCHLICHER, OF SACHENHAUSEN-FRANKFORT-ON-THE-MAIN, GERMANY, ASSIGNOR, BY MESNE ASSIGNMENTS, TO HENRY HESS, OF PHILADELPHIA, PENNSYLVANIA.

GAGE.

1,072,378.  Specification of Letters Patent.  Patented Sept. 2, 1913.

Application filed November 12, 1910. Serial No. 591,952.

*To all whom it may concern:*

Be it known that I, AUGUST BAUSCHLICHER, a subject of the Emperor of Germany, residing at Stegstrasse 64, Sachenhausen-Frankfort-on-the-Main, Germany, have invented certain new and useful Improvements in Gages, of which the following is a specification, reference being had therein to the accompanying drawing.

My invention relates to gages and more especially to that class of gages wherein there is employed one or more gage-pieces such as spheres for determining the dimensions of the objects to be measured or gaged.

The present invention contemplates in connection with each of the gage-pieces or spheres a holding device, the gage-piece and the holding device having certain characteristics, as will hereinafter appear.

I will first describe one or more forms in which my improvements may be embodied and will then point out the novel features in the claims.

Figure 1:
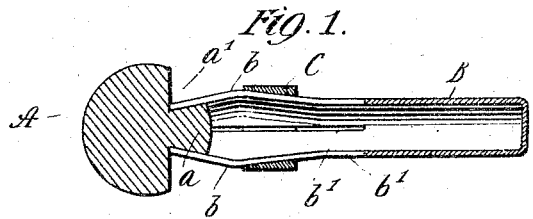
Figure 2:
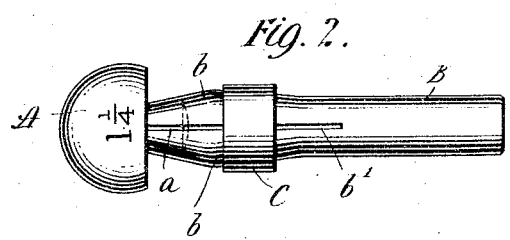
Figure 3:
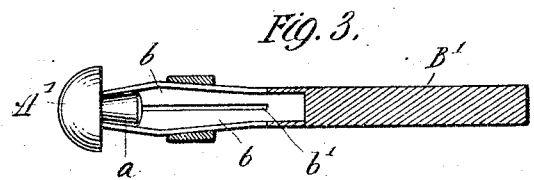
Figure 4:
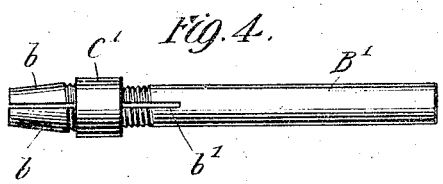

Figure 1 is a central longitudinal section of a gage embodying my improvements. Fig. 2 is an outside view of the same. Fig. 3 shows a modification differing from the first form in several details; and Fig. 4 illustrates a further modification.

Similar letters of reference are employed to designate corresponding parts in the several figures of the drawings.

In the first form, namely that illustrated in Figs. 1 and 2, there is only a single gage-piece shown, and this gage-piece is seen to be spherical or partly spherical, it consisting preferably of a hardened steel ball recessed in the manner to be herein described. A represents such a spherical gage-piece. When only one of them is employed in a gage the gage will be used, for example, for determining the accuracy of interior diameters or bores, and to this end the steel sphere will be scientifically constructed or selected as of the proper diameter. It will be understood that although I illustrate only a single gage, an entire series may be employed of graduated sizes, and in any case it will be a convenience to have stamped or etched upon each of the gage-pieces, the proper characters to indicate the diameters thereof, for example the figures 1¼ are shown on the exterior of the gage-piece in Fig. 2.

According to my invention the gage-piece A is to be provided with a projecting portion capable of locking with the holder or handle to be described, the latter being a device having jaws adapted to engage around and lock with the projecting portion of the gage-piece.

A projecting portion *a* such as my invention contemplates may be produced upon a preformed steel sphere by a process of milling an annular recess at *a'* at one side of the sphere, as clearly seen in Figs. 1 and 2. Preferably the recesses are formed in such a way that the projection *a* diverges or tapers outwardly as seen in the drawings, this rendering the projection capable of locking with the jaws of the handle.

B represents a handle, and it has jaws *b* capable of locking with the diverging projection *a* of the gage-piece A. The jaws *b* are preferably spring jaws and are formed integral with the body of the handle B, a slight motion or spring action being permitted by the presence of one or more slots as shown at *b'*. The body of the handle B is shown as of a tubular form and substantially rigid from its extremity up to the point where the yielding jaws *b* are formed.

The jaws *b* may be described as of a form which first diverges and then converges so as to produce near the middle portion of each jaw an outward extension. The extreme ends of the jaws being converging, readily engage with and grasp the diverging projection *a* of the gage-piece.

When the handle and gage-piece are engaged in this manner, the jaws are intended to be locked in place so as to permanently hold together the handle and gage-piece against accidental separation. A convenient locking means is the ring C capable of sliding longitudinally over the handle B and of such construction and diameter that when forced toward or against the jaws *b* it will act with a wedging operation to squeeze or compress the jaws together and in this way permanently securing them in the position shown.

The above described construction may obviously be varied in many minor details and other mechanical expedients may be substituted for the particular details illustrated. For example, in Fig. 3 the handle B' is constructed not of a hollow or tubular form, but of a solid piece of metal which has been bored into at the jaw end for the formation of the yielding jaws. Also the gage member in this instance consists of a sphere which is milled or recessed in a different way from that shown in Figs. 1 and 2, the recessing in Fig. 3 removing substantially a hemisphere with the exception of the diverging projection $a$. Also in Fig. 4 the connection between the locking ring C' and the jaws is not a mere sliding connection but consists of screw threads formed on the respective members so that the ring C' constitutes a nut which may be tightened or locked to a greater degree of security, rigidity and permanence than in the other instances.

What I claim as new and desire to secure by Letters Patent, is:

1. A plug or bore gage comprising in combination a one-piece gaging element adapted to enter the bore or interior to be gaged and afford all the gaging contacts therefor, and a separate handle, said gage-piece provided with a projecting portion capable of locking with the handle, and said handle having jaws adapted to lock with said projection.

2. A plug or bore gage comprising in combination a one-piece gaging element adapted to enter the bore or interior to be gaged and afford all the gaging contacts therefor, and a separate handle, said gage-piece provided with a projecting portion capable of locking with the handle, and said handle having tapered jaws adapted to lock with said projection, and a locking ring movable over said jaws.

3. A plug or bore gage comprising in combination a one-piece gaging element adapted to enter the bore or interior to be gaged and afford all the gaging contacts therefor, and a separate handle, said gage-piece provided with a projecting portion capable of locking with the handle, and said handle having tapered and threaded jaws adapted to lock with said projection, and a threaded locking ring engaging the threads on said jaws.

4. A gage comprising in combination a hardened steel sphere cut away to afford a diverging lug, and a handle having jaws adapted to lock with such projection.

5. A gage comprising in combination a hardened steel sphere cut away to afford a diverging lug, and a handle having jaws adapted to lock with such projection, and a locking device for said jaws.

In testimony whereof I affix my signature in presence of two witnesses.

AUGUST BAUSCHLICHER.

Witnesses:
JEAN GRUND,
CARL GRUND.